United States Patent
Zupancic et al.

(10) Patent No.: US 12,441,832 B2
(45) Date of Patent: Oct. 14, 2025

(54) ISOCYANATE-FREE LAMINATING ADHESIVE

(71) Applicants: Dow Global Technologies LLC, Midland, MI (US); Rohm and Haas Company, Collegeville, PA (US)

(72) Inventors: Joseph J. Zupancic, Glen Ellyn, IL (US); Tuoqi Li, Dallas, TX (US); Wenwen Li, Pearland, TX (US)

(73) Assignee: Arkema France, Puteaux (FR)

( * ) Notice: Subject to any disclaimer, the term of this patent is extended or adjusted under 35 U.S.C. 154(b) by 449 days.

(21) Appl. No.: 17/597,416

(22) PCT Filed: Jun. 10, 2020

(86) PCT No.: PCT/US2020/036927
§ 371 (c)(1),
(2) Date: Jan. 5, 2022

(87) PCT Pub. No.: WO2021/011125
PCT Pub. Date: Jan. 21, 2021

(65) Prior Publication Data
US 2022/0289900 A1 Sep. 15, 2022

Related U.S. Application Data

(60) Provisional application No. 62/874,027, filed on Jul. 15, 2019.

(51) Int. Cl.
*C08G 59/22* (2006.01)
*C08G 63/91* (2006.01)
*C09J 163/00* (2006.01)

(52) U.S. Cl.
CPC .......... *C08G 59/22* (2013.01); *C08G 63/916* (2013.01); *C09J 163/00* (2013.01)

(58) Field of Classification Search
CPC ...... C08G 59/22; C08G 63/916; C08G 59/04; C08G 59/502; C09J 163/00
USPC .............................................. 156/307.3, 314
See application file for complete search history.

(56) References Cited

U.S. PATENT DOCUMENTS

| | | | |
|---|---|---|---|
| 5,567,761 A | 10/1996 | Song | |
| 6,489,405 B1 | 12/2002 | Beisele | |
| 7,615,595 B2 | 11/2009 | Lutz et al. | |
| 8,445,585 B2 | 5/2013 | Paar et al. | |
| 9,701,786 B2 | 7/2017 | Zupancic et al. | |
| 9,701,787 B2 | 7/2017 | Zupancic et al. | |
| 9,751,977 B2 | 9/2017 | Zupancic et al. | |
| 9,752,066 B2 | 9/2017 | Zupancic et al. | |
| 10,259,200 B2 | 4/2019 | Johnson | |
| 10,513,643 B2 | 12/2019 | Zupancic et al. | |
| 11,267,990 B2 | 3/2022 | Ogawa et al. | |
| 11,649,379 B2 | 5/2023 | Yoshida et al. | |
| 2004/0069405 A1* | 4/2004 | Hachikian | C09J 163/00 156/330 |
| 2010/0071849 A1 | 3/2010 | Knott et al. | |
| 2011/0313091 A1 | 12/2011 | Argyropoulos et al. | |
| 2012/0165493 A1 | 6/2012 | Stanjek et al. | |
| 2016/0289518 A1* | 10/2016 | Zupancic | C08G 59/5073 |
| 2017/0369634 A1* | 12/2017 | Zupancic | C08G 63/672 |
| 2019/0119536 A1 | 4/2019 | Vinci et al. | |
| 2019/0284457 A1* | 9/2019 | Nakamura | C08G 18/7671 |

FOREIGN PATENT DOCUMENTS

| | | |
|---|---|---|
| JP | 2009-088467 A | 4/2009 |
| WO | 2014/070818 A1 | 5/2014 |
| WO | 2016/105722 A1 | 6/2016 |

OTHER PUBLICATIONS

Duncan et al., "A Review of Adhesive Bonding Assembly Processes and Measurement Methods," MMS9 Report No. 1, Mar. 2003, ISSN 1473-2734, National Physical Laboratory, Teddington, Middlesex, Uk, TW 11 0LW, © Crown copyright 2003 (pp. 4-10). (Year: 2003).*
PCT/US2020/036927, International Search Report and Written Opinion with a mailing date of Sep. 18, 2020.
PCT/US2020/036927, International Preliminary Report on Patentability with a mailing date of Jan. 18, 2022.

* cited by examiner

*Primary Examiner* — Cynthia L Schaller
(74) *Attorney, Agent, or Firm* — Boyle Fredrickson S.C.

(57) ABSTRACT

An epoxy terminated polyester; an adhesive formulation including the epoxy terminated polyester and a curative composition; a laminating adhesive prepared from the above adhesive formulation; a process of making a laminate; a laminate made by the above process; and a flexible package prepared from the above laminate.

12 Claims, No Drawings

ISOCYANATE-FREE LAMINATING ADHESIVE

FIELD

The present invention relates to an adhesive formulation and its preparation; and a method of using such adhesive formulation to make laminates. More specifically, the present invention relates to a non-isocyanate solventless laminating adhesive formulation including a solventless epoxy-terminated polyester with an amine-based curative, wherein the adhesive formulation is suitable for use in a one-shot coating/laminating process.

BACKGROUND

Solventless polyurethane adhesives are well known. In general, such adhesives are prepared by mixing reactive chemical components, such as a polyol and an isocyanate, in the presence of normally used additives such as a suitable catalyst and/or an adhesion promoter. Solventless polyurethane adhesives are a useful class of laminating adhesives. Such adhesives are liquid compositions that contain the polyol and isocyanate components; and such adhesives are also referred to as two-part curable adhesives. The two-part curable adhesives are useful for a variety of purposes including, for example, as adhesives for bonding films together to form laminates. Also, the adhesives are useful in the packaging industry, especially in making flexible food packaging.

Heretofore, solventless polyurethane adhesives have been used in conventional solventless coating and laminating processes. In such conventional process, a polyol compound and an isocyanate compound make up the adhesive system, formulation or composition which is also referred to as a two-part adhesive system. In the conventional process, the polyol and an isocyanate compounds are mixed together and applied to a primary web (a first film) and then the primary web is laminated to a secondary web (a second film). Thereafter, the combined adhesive/web structure is cured. Thus, to be useful in a conventional solventless coating/laminating process, the mixed adhesive system must possess: (1) an appropriate application viscosity; and (2) an appropriate pot-life stability.

"Application viscosity" herein means the starting viscosity of a formulation just prior to applying the adhesive formulation as a coating on a substrate at an application temperature. Generally, the application viscosity is typically from about 1,000 millipascals-second (mPa·s) to less than or equal to (≤) 5,000 mPa·s at an application temperature of from about 40 degrees Celsius (° C.) to 60° C. "Pot-life stability" herein means that the initial viscosity of the adhesive formulation does not double [i.e., does not increase 2 times] in about 40 minutes [min]) during the coating/laminating process.

Another solventless coating and laminating process known in the art is referred to as a "one-shot duplex coating/lamination process" (herein the "one-shot method") and the adhesive system used in such process is also a solventless isocyanate-based adhesive system. Prior art which teaches a solventless isocyanate-based adhesive system for use in the one-shot method is taught, for example, in WO 20171996A1. In the one-shot method, two components (Part A and Part B) of the base resin are applied independently to two separate films, i.e. Part A is applied to a primary film (web) and Part B is applied to a secondary film (web); and then, the primary film and the secondary film are brought together during a nipping step of the lamination process. The mixing of Part A and Part B occurs during the nipping step. By applying the two components of the adhesive system separately and independently of one another without pre-mixing the two components, and by having the mixing occur at the nipping step of the process, the constraint on pot-life stability and the necessity to fine tune the adhesive system to provide an adhesive system having a controlled mixed application viscosity as described above, are eliminated.

An alternative to the solventless isocyanate-based adhesive system has recently been developed which is a solventless alternate cure (non-isocyanate) adhesive system based on an aliphatic or a cyclo-aliphatic epoxy terminated polyester cured with an amine-based curative as described in U.S. Pat. Nos. 9,751,977; 9,752,066; 9,701,786; and 9,701,787. The advantages of the solventless epoxy terminated polyester based adhesive system (i.e., an isocyanate-free adhesive system) over the solventless isocyanate based adhesive system (i.e. an isocyanate-containing adhesive system) include, for example: (1) because the epoxy system is isocyanate-free, the use of this adhesive system eliminates the potential for workers/operators to being exposed to isocyanates; (2) the use of the adhesive system containing no aromatic isocyanates eliminates the potential for generating possible mutagenic or carcinogenic aromatic amines as hydrolysis products which can potentially migrate into food contained in packaging made using the adhesive system; and (3) the use of aliphatic or cyclo-aliphatic epoxides in the adhesive system enables a curing chemistry which does not introduce an undesirable aromatic epoxide such as bisphenol-A epoxy resin, which is a potential endocrine disrupter, into packaging used in the food industry.

It is desirous to provide a non-isocyanate-based adhesive that can advantageously be used in combination with a one-shot method to overcome the problems of isocyanate-based adhesives of the prior art regarding application viscosity and pot-life stability; and to provide an improved process of manufacturing laminates.

SUMMARY

One general embodiment of the present invention is directed to a novel epoxy terminated polyester composition including an epoxy terminated polyester having the following Structure (I):

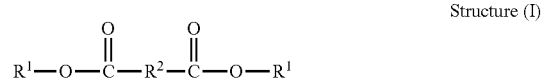

Structure (I)

In a preferred embodiment, the two —$R^1$ groups in the above Structure (I) may be identical or different; and each $R^1$ group can have the following Structure (II):

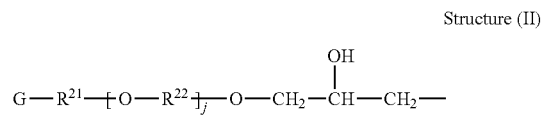

Structure (II)

In another preferred embodiment, the group —$R^2$— in the above Structure (II) is a divalent organic group having fewer than 50 carbon atoms; the group G- has the structure:

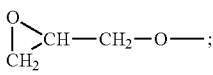

the number j is from 0 to 5; the group —$R^{21}$— is a divalent alkyl group; and the group —$R^{22}$— is a divalent alkyl group.

Another embodiment of the present invention is directed to a process of making the above epoxy terminated polyester.

Still another embodiment of the present invention is directed to an adhesive formulation including (A) the above epoxy terminated polyester, and (B) a curative composition.

Yet another embodiment of the present invention is directed to a process of making the above adhesive formulation.

Even still another embodiment of the present invention is directed to a laminating adhesive prepared from the above adhesive formulation.

Even yet another embodiment of the present invention is directed to a process of making a laminate including the steps of:

(I) providing an epoxy terminated polyester;
(II) providing a curative composition;
(III) coating a first film substrate with the epoxy terminated polyester;
(IV) coating a second film substrate with the curative composition; and
(V) laminating the first film and second film together; wherein the epoxy terminated polyester on the first film contacts the curative composition on the second film; wherein an in situ reaction occurs between the epoxy terminated polyester on the first film and the curative composition on the second film to form a bond between the first film and the second film; and wherein a bonded laminate structure consisting of a first film and a second film with a bond layer disposed inbetween the first film and the second film.

Still other embodiments of the present invention are directed to a laminate made by the above process; and a flexible package prepared from the laminate.

In one preferred embodiment, the present invention is directed to a process for producing a laminate utilizing a solventless alternate cure (non-isocyanate curing) adhesive system in combination with a one-shot method.

Among other objectives of the present invention, a novel adhesive formulation is provided by introducing a novel monomer, such as tetraethylene glycol, into a polyester backbone wherein the resulting adhesive formulation has an optimum application viscosity. Also, as described in the Examples which follow, the molecular weight of the polyester backbone of the adhesives is increased (and in some cases, for example, the molecular weight is doubled) because even though a higher molecular weight decreases the adhesion strength of the adhesive formulation on various laminate substrates, the increase in molecular weight of the polyester backbone of the inventive adhesive formulations does not compromise the adhesion strength of the inventive adhesive formulations. Additionally, the adhesive formulations of the Inventive Examples have a lower mixing ratio of epoxy-terminated polyester to amine curative compared to Comparative Example formulations, and such lower mixing ratio contributes to a higher adhesion strength of the Inventive Example adhesive formulations on various laminate structures.

DETAILED DESCRIPTION

A "dicarboxylic acid" is a compound containing two carboxyl (—COOH) groups.

A "polyester" is a compound containing two or more ester linkages in the same linear chain of atoms.

A "carboxylic acid terminated polyester" is a compound that is a polyester and a dicarboxylic acid. Nonlimiting examples of suitable polyester polyols include polycondensates of diols, polyols (e.g., triols, tetraols), dicarboxylic acids, polycarboxylic acids (e.g., tricarboxylic acids, tetracarboxylic acids), hydroxycarboxylic acids, lactones, and combinations thereof. The carboxylic acid terminated polyesters can also be derived from, instead of the free polycarboxylic acids, the corresponding polycarboxylic anhydrides, or corresponding polycarboxylic esters of lower alcohols.

An "ether group" is a moiety containing an oxygen atom bonded to two alkyl or aryl groups.

A "substituted ether group," refers to an ether group in which one or more hydrogen atom bound to any carbon of the alkyl or aryl is replaced by another group such as a phosphate, a hydroxy, and combinations thereof.

A "polyamine" is a compound that has two or more amine groups; the amine groups may be primary or secondary or a mixture thereof.

A "diamine" is a compound that has exactly two amine groups; a diamine may have two primary amine groups, two secondary amine groups, or one primary amine group and one secondary amine group.

An "aliphatic group" is a chemical group that contains only carbon and hydrogen atoms and that contains no aromatic rings.

A "cycloaliphatic group" is an aliphatic group that contains one or more cyclic structures.

An "alkyl group" is an aliphatic group that has no double bonds. Alkyl groups include, for example, monovalent and divalent alkyl groups such as, for example, methylene groups, methyl groups, ethylene groups, ethyl groups, and larger alkylene and alkyl groups.

A "cycloalkyl group" is an alkyl group that contains one or more cyclic structures.

An "aromatic group" is any group having an aromatic ring.

An "aliphatic amine" is an amine in which the nitrogen atom of each amine group is bonded to a carbon atom that is part of an aliphatic group.

An "aromatic amine" is an amine in which the nitrogen atom of each amine group is bonded to a carbon atom that is part of an aromatic ring.

When a ratio is said herein to be "X:1 or greater", it is meant that the ratio is Y:1, where Y is greater than or equal to X. For example, if a ratio is said to be 3:1 or greater, that ratio may be 3:1 or 5:1 or 100:1 but may not be 2:1. Similarly, when ratio is said herein to be "W:1 or less", it is meant that the ratio is Z:1, where Z is ≤W. For example, if a ratio is said to be 15:1 or less, that ratio may be 15:1 or 10:1 or 0.1:1 but may not be 20:1.

A "solventless adhesive" is an adhesive composition that is void of, or substantially void of, a solvent.

"Acid value" (or "acid number") is a measure of the amount of carboxylic acid present in a component or a composition. The acid value is the number of milligrams of potassium hydroxide required for the neutralization of free carboxylic acids present in one gram (g) of a substance (e.g., a polyol). Acid value units for acid value are milligrams of potassium per 1 gram (mg KOH/g). Acid value (AV) is measured in accordance with ASTM D 1386/7.

"Epoxy equivalent weight (EEW)" is measured in accordance with ASTM D 1652.

"Amine number" is measured in accordance with ASTM D2074-07 for test methods for total, primary, secondary and tertiary amine values of fatty amines by alternative indicator method.

"Viscosity" is measured at 25° C. and at 40° C. in accordance with ASTM D2196. Viscosity is reported in units of mPa s, which is equivalent to units of centipoise.

Size Exclusion Chromatography (SEC) Analysis

Weight average molecular weight ($M_w$) and number average molecular weight ($M_n$) are measured using a gel permeation chromatography (GPC) system. The "Z average molecular weight" ($M_z$) is the third moment average molar mass. $M_z$ is also measured using a GPC system.

$M_n$, $M_w$, and $M_z$ are calculated according to the following Equations (I), (II), and (III), respectively:

$$\overline{Mn} = \frac{\sum_i Wf_i}{\sum_i (Wf_i / M_i)} \quad \text{Equation (I)}$$

$$\overline{Mw} = \frac{\sum_i (Wf_i * M_i)}{\sum_i Wf_i} \quad \text{Equation (II)}$$

$$\overline{Mz} = \frac{\sum_i (Wf_i * M_i^2)}{\sum_i (Wf_i * M_i)} \quad \text{Equation (III)}$$

wherein Wfi is the weight fraction of the i-th component and Mi is the molecular weight of the i-th component. Polydispersity is calculated in accordance with the following Equation (IV):

$$PDI = \overline{M_w} / \overline{M_n} \quad \text{Equation (IV)}$$

The content of species having a $M_w$ of less than (<) 500 grams per mole (g/mol), and a $M_w$ of <1,000 g/mol for a polyol is measured using "GPC One" software available from PolymerChar Inc. and using the following Equation (V):

$$f = \Sigma^j Wf_j / \Sigma^i Wf_i \quad \text{Equation (V)}$$

wherein $Wf_j$ is the weight fraction of the j-th component with a molecular weight of lower than 500 g/mol or a molecular weight of lower than 1,000 g/mol, respectively.

The composition of the present invention is an epoxy terminated polyester having the following Structure (I):

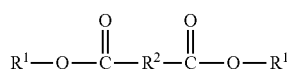

Structure (I)

In the above Structure (I), the two —R¹ groups may be identical or different; and each R¹ group has the following Structure (II):

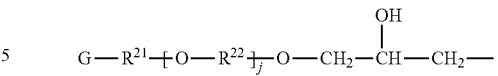

Structure (II)

In the above Structure (II), the group —R²— is a divalent organic group having fewer than 50 carbon atoms; the group G- has the structure:

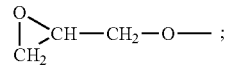

the number j is from 0 to 5; the group —R²¹— is a divalent alkyl group; and the group —R²²— is a divalent alkyl group.

In addition to one or more compounds having Structure (I), the composition of the present invention may also contain one or more compounds having the following Structure (III):

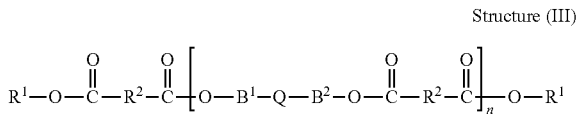

Structure (III)

where in Structure (III) above, —B¹— has the following structure:

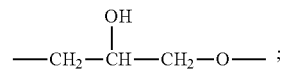

—B²— has the following structure:

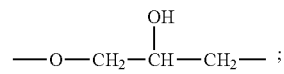

-Q- has the following structure:

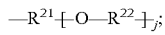

j is from 0 to 5; n is from 1 to 6; the group —R²¹— is a divalent alkyl group; and the group —R²²— is a divalent alkyl group.

In a preferred embodiment, the group —R²— of Structure (III) above is a group having the following Structure (IV):

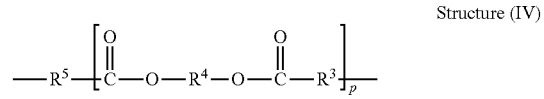

Structure (IV)

In Structure (IV) above, the number p is from 0 to 20 in one embodiment, from 0 to 10; in another embodiment, and from 0 to 5 in still another embodiment. Each —R³—, each —R⁴—, and each —R⁵— is, independent of the other, a divalent organic group. Within a single —R²— group, if p is 2 or greater, the various —R³— groups may be identical to each other or different from each other. Within a single —R²— group, if p is 2 or greater, the various —R⁴— groups may be identical to each other or different from each other.

In one preferred embodiment, —R³— is selected from one or more divalent aliphatic groups, one or more divalent aromatic hydrocarbon groups, or a mixture thereof. Among aliphatic groups, —R³— are alkyl groups in one embodiment; —R³— are linear or branched alkyl groups in another embodiment; and —R³— are linear alkyl groups in still another embodiment. Among aliphatic groups, —R³— are groups with 1 or more carbon atoms in one embodiment; —R³— are groups with 2 or more carbon atoms in another embodiment; and —R³— are groups with 3 or more carbon atoms in still another embodiment. Among aliphatic groups, —R³— are groups with 12 or fewer carbon atoms in one embodiment; —R³— are groups with 8 or fewer carbon atoms in another embodiment; and —R³— are groups with 6 or fewer carbon atoms in still another embodiment. Among aliphatic groups, —R³— is —CH₂CH₂CH₂CH₂— in one preferred embodiment.

Among aromatic groups, one preferred embodiment includes aromatic groups with the following structure:

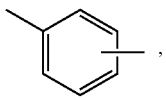

including mixtures of isomers; and in another preferred embodiment, aromatic groups include those having the following structure:

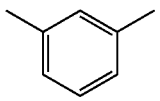

In a preferred embodiment, the groups that are suitable for —R⁵— in Structure (IV) above are the same groups as those for —R³—. The group —R⁵— may be different from all of the —R³— groups, or the group —R⁵— may be the same as one or all of the —R³— groups.

In another preferred embodiment, the group —R⁴— is either an aliphatic group or an aliphatic ether group. An aliphatic ether group has the following Structure (V):

$$-R^8-[-O-R^9-]_r-O-R^{10}-$$ Structure (V)

where —R⁸— and —R⁹— (if present), and —R¹⁰— are aliphatic groups, and where r is from 0 to 10. The groups —R⁸— and —R⁹— (if present), and —R¹⁰— may be identical or may be different from each other. When —R⁴— is an aliphatic ether group, the following preferred embodiments apply to —R⁸—, —R⁹— (if present), —R¹⁰—, and r. For example, in one preferred embodiment, —R⁸— and —R⁹— (if present) and —R¹⁰— are identical. In another preferred embodiment, —R⁸— and —R⁹— (if present) and —R¹⁰— are linear or branched alkyl groups. In still another embodiment, —R⁸— and —R⁹— (if present) and —R¹⁰— each have 4 or fewer carbon atoms; 3 or fewer carbon atoms in yet another embodiment; and exactly 2 carbon atoms in even still another embodiment. The r in Structure (V) above is from 0 to 10 in one embodiment, from 0 to 5 in another embodiment, from 0 to 2 in still another embodiment; and zero in yet another embodiment. When —R⁴— is an aliphatic group, —R⁴— is an alkyl group in one embodiment and a linear alkyl group in another preferred embodiment. When —R⁴— is an aliphatic group, —R⁴— has 1 or more carbon atoms. When —R⁴— is an aliphatic group, —R⁴— has 6 or fewer carbon atoms in one embodiment; 4 or fewer carbon atoms in another embodiment; 3 or fewer carbon atoms in still another embodiment; and exactly 2 carbon atoms in yet another embodiment.

In some embodiments (herein called "mixed polyester" embodiments), p is greater than 1, and some of the —R³— groups are not identical to other —R³— groups. In some mixed polyester embodiments, —R²— has the following Structure (VI):

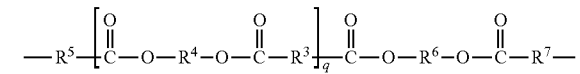

Structure (VI)

The groups —R³— and —R⁴— and —R⁵— are as defined herein above, and q can be 0 or higher in one embodiment, and q is 1 or higher in another embodiment. In still another embodiment, q is from 0 to 9 and from 1 to 4 in yet another embodiment. The suitable groups for —R⁶— are the same as those for —R⁴—. The suitable groups for —R⁷— are the same as those for —R³—. In some mixed polyester embodiments (herein called "MP1" embodiments), —R⁵— is identical to —R³—, —R⁶— is identical to —R⁴—, and —R⁷— is different from —R³—. In some MP1 embodiments, all the —R⁴— groups are identical to each other; in other MP1 embodiments, some —R⁴— groups are different from other —R⁴— groups. In some mixed polyester embodiments (herein called "MP2" embodiments), —R⁵— is identical to —R⁷—, —R⁶— is identical to —R⁴—, and —R⁷— is different from —R³—. In some MP2 embodiments, all the —R⁴— groups are identical to each other; and in other MP2 embodiments, some —R⁴— groups are different from other —R⁴— groups.

Other preferred embodiments can be selected from the following:
(a) embodiments in which p=0;
(b) embodiments in which p is 1 or greater and in which all the —R³— groups are identical to each other, all the —R⁴— groups are identical to each other, and —R⁵— is identical to —R³—;
(c) MP1 embodiments; and
(d) MP2 embodiments.

In Structure (II), j is 1 or more in one embodiment. In Structure (II), j is 5 or less in another embodiment; 4 or less in still another embodiment; 3 or less in yet another embodiment; and 2 or less in even still another embodiment. In Structure (II), j is 1 in a preferred embodiment.

In Structure (II), —R²¹— is a divalent alkyl group in one general embodiment. In one preferred embodiment, —R²¹— has 2 or more carbon atoms; and 3 or more carbon atoms in another embodiment. In still another embodiment, —R²¹— has 6 or fewer carbon atoms; 5 or fewer carbon atoms in yet another embodiment; and 4 or fewer carbon atoms in even still another embodiment. In even yet another embodiment, —R²¹— has 3 carbon atoms. Among embodiments in which —R²¹— has 3 carbon atoms, in one preferred embodiment, —R²¹— is selected from the following Structures (VII), (VIII), and (IX):

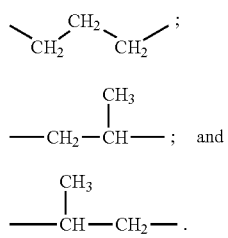

Structure (VII)

Structure (VIII)

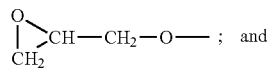

Structure (IX)

In some embodiments, a mixture of polyesters can be present in which one polyester will have an —$R^{21}$— group, that is, one group having a Structure (VII), (VIII), or (IX); and another polyester can be present in which an —$R^{21}$— group is a different group having a Structure (VII), (VIII), or (IX).

In Structure (V), if j is 1 or more, the suitable structures for —$R^{22}$— are the same as those for —$R^{21}$—. The —$R^{22}$— group may be the same as —$R^{21}$— or different from —$R^{21}$—. If j is 2 or more, each —$R^{22}$— may be the same as every other —$R^{22}$— or some —$R^{22}$— groups may be different from other —$R^{22}$— groups. In one preferred embodiment, every —$R^{22}$— has the same number of carbon atoms as every other —$R^{22}$—. In another preferred embodiment, —$R^{21}$— has the same number of carbon atoms as every —$R^{22}$— group. In still another preferred embodiment, every —$R^{22}$— has three carbon atoms. In yet another preferred embodiment, at least one —$R^{22}$— has a Structure (VIII) or a Structure (IX).

The epoxide terminated polyesters of the present invention have an EEW of 275 or higher in one embodiment; 350 or higher in another embodiment; and 400 or higher in still another embodiment. The epoxide terminated polyesters of the present invention have an EEW of 3,500 or lower in one embodiment; an EEW of 2,500 or lower in another embodiment; and an EEW of 2,000 or lower in still another embodiment. The number-average molecular weight ($M_n$) of the epoxy terminated polyester of the present invention is 500 or higher in one embodiment; and 1,000 or higher in another embodiment. The $M_n$ of the epoxy terminated polyester of the present invention is 8,000 or lower in one embodiment, 6,000 or lower in another embodiment, and 3,500 or lower in still another embodiment.

It is useful to characterize the level of low number average molecular weight (e.g., ≤1,000 Daltons [Da]) species present in the composition of the present invention. The level of low number average molecular weight species is defined as the percentage by weight of species having number average molecular weight of ≤1,000 Da, based on the total weight of the composition. The level of low number average molecular weight species is 55 percent (%) or less in one embodiment; 30% or less in another embodiment; and 25% or less in still another embodiment.

The composition of the present invention may be made by any conventional method known to those skilled in the art. In one preferred embodiment, the method used to produce the composition includes reacting at least one diepoxide with at least one dicarboxylic acid. The diepoxide has the following Structure (X):

G-Q-G         Structure (X)

G in Structure (X) has the following structure:

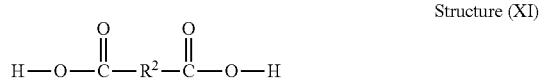

Q in Structure (X) is the same as defined with reference to Structure (III). The dicarboxylic acid has the following Structure (XI):

Structure (XI)

$$H-O-\overset{O}{\underset{\|}{C}}-R^2-\overset{O}{\underset{\|}{C}}-O-H$$

The group —$R^2$— is as defined with reference to Structure (IV). Sufficient amount of compound having Structure (XI) is used such that the reaction produces a compound having Structure (IV).

In general, compounds of Structure (XI) have an acid value (which is measured as described below) of 110 or higher in one embodiment; 120 or higher in another embodiment; and 125 or higher in still another embodiment. In other embodiments, compounds of Structure (XI) have an acid value of 260 or lower in one embodiment; 200 or lower in another embodiment; and 175 or lower in still another embodiment. In a preferred embodiment, compounds of Structure (XI) have a number average molecular weight of 430 or higher; 560 or higher in another embodiment; and 640 or higher in still another embodiment. In other preferred embodiments, compounds of Structure (XI) have a number average molecular weight of 1,020 or lower in one embodiment; 940 or lower in another embodiment; and 900 or lower in still another embodiment. Mixtures of suitable compounds of Structure (XI) can also be used.

In the reaction of at least one diepoxide with at least one dicarboxylic acid, the stoichiometric ratio of epoxide groups to carboxylic acid groups can be, for example, 3.1:1 or greater in one embodiment; 2.9:1 or greater in another embodiment; and 2.7:1 or greater in still another embodiment. In other embodiment, the stoichiometric ratio of epoxide groups to carboxylic acid groups can be, for example, 2:1 or less in one embodiment; 1.6:1 or less in another embodiment; and 1.3:1 or less in still another embodiment.

The amount of the epoxy-terminated polyester composition used in the present invention process can be, for example, from 50 weight percent (wt %) to 95 wt % in one embodiment, from 65 wt % to 85 wt % in another embodiment and from 75 wt % to 80 wt % in still another embodiment. Below a concentration of 50 wt % and above a concentration of 95 wt %, the adhesive composition would not be able to fully cure.

The viscosity of the epoxy-terminated polyester composition is generally in the range of from 1,000 mPa·s to 10,000 mPa·s at 75° C. in one embodiment; and from 10,000 mPa·s to 150,000 mPa·s at 25° C. in another embodiment. The weight fraction of <500 g/mol should be <20% in one embodiment, <10% in another embodiment, and <5% in still another embodiment. The weight fraction of <1,000 g/mol should be <30% in one embodiment, <20% in another embodiment, and <10% in still another embodiment.

Curative compounds useful in the present invention include compounds that have two or more groups capable of reacting with epoxy groups. The curative compounds include, for example, amino compounds. In one preferred embodiment, the amino compounds are phenalkamines, phenalkamides, and amine-terminated amide resins. Amine-terminated amide resins are reaction products of dicarboxylic acids and diamines. The dicarboxylic acids useful for forming amine-terminated amide resins include, for example, dimer acids, which are the reaction products of two molecules of an unsaturated fatty acid. Unsaturated fatty acids have the structure $R^{19}$—COOH, where $R^{19}$— is an aliphatic group having eight or more carbon atoms. Additionally, the aliphatic group can contain one or more carbon-carbon double bonds.

The diamines useful for forming amine-terminated amide resins include, for example, ethylenediamine, diethylenetriamine, triethylenetriamine, tetraethylenepentamine, piperazine, aminoethylpiperazine, isophorone diamine, xylylenediamine, and mixtures thereof. The curative useful in the present invention has an amine number of at least 150 in one embodiment, at least 160 in another embodiment, and at least 170 in still another embodiment. In some embodiments, the curative component useful in the present invention has an amine number, for example, not to exceed 420 in one embodiment, not to exceed 380 in another embodiment, and not to exceed 360 in still another embodiment.

The viscosity of the curative compound can be in the range of from 1,000 mPa·s to 10,000 mPa·s at 75° C. in one embodiment; and from 50,000 mPa·s to 100,000 mPa·s at 25° C. in another embodiment.

The amount of the curative composition used in the present invention process can be, for example, from 5 wt % to 50 wt % in one embodiment, from 15 wt % to 35 wt % in another embodiment and from 20 wt % to 25 wt % in still another embodiment. Below a concentration of 5 wt % and above a concentration of 50 wt %, the adhesive composition would not be able to fully cure.

In some embodiments, an additive can optionally be included in the adhesive composition. Examples of such additives include, but are not limited to, tackifiers, plasticizers, rheology modifiers, adhesion promoters, antioxidants, fillers, colorants, surfactants, solvents, and combinations of two or more thereof.

In general, the solventless adhesive composition of the present invention is formulated when the (a) the epoxy terminated polyester composition; (b) the curative composition; and (c) any desired optional components are mixed together and the mixture is allowed to react to form an adhesive bond. However, in one general embodiment, until it is desired to form a laminate structure, it is contemplated that the epoxy-terminated polyester, component (a) and the amine curative, component (b) of the solventless adhesive composition of the present invention are formulated separately and stored. In a preferred embodiment, the epoxy-terminated polyester component and amine curative component are in a liquid state at 25° C. Even if the components are solid at 25° C., it is acceptable to heat the components as necessary to form the components into a liquid state before the components are used. As the pot-life of the adhesive composition is decoupled from the curing process, the components can be stored indefinitely.

Exemplary of some of the process benefits of the adhesive formulation of the present invention can include, for example: (1) the adhesive formulation has a good application viscosity; (2) the adhesive formulation has a good pot-life stability; and (3) the two reactive components, which make up the adhesive formulation, can be separated without concern for the pot-life of the two components.

For example, the application viscosity of the adhesive formulation includes, for example, a viscosity of from 1,000 mPa·s to ≤5,000 mPa·s at an application temperature of from 40° C. to 60° C. in one embodiment; and from 1,200 mPa·s to 2,500 mPa·s at an application temperature of from 40° C. to 60° C. in another embodiment.

For example, the pot life of the adhesive formulation includes, for example, a pot-life such that the viscosity of the adhesive formulation does not double or increase 2 times in 40 min in one embodiment, and the viscosity of the adhesive formulation does not increase by from 20% to 80% in 40 min in another embodiment.

Exemplary of an operational benefit of the adhesive formulation of the present invention can include, for example, the adhesive formulation does not create exposure to the toxic isocyanate compound.

Exemplary of some of the performance benefits of the adhesive formulation of the present invention can include, for example: (1) a good adhesion strength for various types of films, and (2) the adhesive formulation is useful in all of the representative structures used in general and medium performance applications.

For example, the adhesion strength (fully cured, after 14 days) of the adhesive formulation includes, for example, an adhesion strength of from 0.5 Newtons per 15 millimeters (N/15 mm) to 4 N/15 mm in one embodiment; and from 0.7 N/15 mm to 3.5 N/15 mm in another embodiment.

A laminate comprising the solventless adhesive composition of the present invention can be formed by first applying separately to two different substrates, such as two separate films, the epoxy-terminated polyester component to one of the films and the amine curative component to the other film. As used herein, a "film" is any structure that is 0.5 millimeters (mm) or less in one dimension of the structure; and is 1 centimeter (cm) or more in both of the other two dimensions of the structure. A "polymer film" is a film that is made of a polymer or mixture of polymers. The composition of a polymer film is, typically, 80 percent by weight or more of one or more polymers.

In one embodiment, for instance, a layer of the epoxy-terminated polyester, component (a), is applied to a surface of a first substrate. The thickness of the layer of the epoxy-terminated polyester component on the first substrate is generally from 0.5 micron (µm) to 2.5 µm in one preferred embodiment. A layer of the amine curative, component (b), is applied to a surface of a second substrate. The thickness of the layer of the amine curative component on the second substrate is generally from 0.5 µm to 2.5 µm in one preferred embodiment. By controlling the thickness of the layers applied to each substrate, the ratio of the two components can be controlled. In some embodiments, the mix ratio of the epoxy-terminated polyester component to the amine curative component in the final adhesive composition can be 100:15 in one embodiment, 100:21 in another embodiment, and 100:40 in still another embodiment. The adhesive composition of the present invention is more forgiving than traditional adhesives and can accommodate some coating weight error (e.g., a coating weight error of up to about 10%).

The first and second substrates are then run through a device for applying external pressure to the first and second substrates, such as nip roller. The feed of the first and second substrates to the nip roller is such that the surface of the first substrate containing the layer of the epoxy-terminated polyester component faces the surface of the second substrate containing the layer of the amine curative component; and the two components come into contact with each other after passing through the nip roller. Bringing the epoxy-terminated polyester component and amine curative component together forms a curable adhesive mixture layer. When the surfaces of the first and second substrates are brought together, the thickness of the resulting curable adhesive mixture layer is generally from 1 μm to 5 μm in one embodiment. The epoxy-terminated polyester component and the amine curative component begin to mix and react with each other when the first and second substrates are brought together and the components come into contact with each other. The two substrates coming into integral contact with each other marks the beginning of the curing process of the solventless adhesive composition of the present invention.

Further mixing and reacting of the two components of the adhesive composition, i.e., the epoxy-terminated polyester component and the amine curative component, is accomplished as the first and second substrates are run through various other rollers; and ultimately when the first and second substrates are subjected to a rewind roller. The further mixing and reacting occurs as the first and second substrates pass through rollers because the substrates each take longer or shorter paths than the other substrate across each roller. In this way, the two substrates move relative to one another, mixing the components on the respective substrates. Arrangements of such rollers in an application apparatus are commonly known in the art. The curable mixture is then cured or allowed to cure.

Suitable substrates in the laminate structure include films such as paper, woven and nonwoven fabric, polymer films, metal foil, metal-coated (metallized) polymer films, and combinations thereof. Some films optionally have a surface on which an image is printed with ink which may be in contact with the adhesive composition. The substrates are layered to form a laminate structure, with an adhesive composition according to the present invention adhering one or more of the substrates together.

After the lamination step, the laminated materials are cured under ambient conditions (25° C., 50% relative humidity) in one embodiment, and from ambient conditions to elevated temperature conditions (up to 50° C., 50% relative humidity). During the curing process, the laminated materials should be kept under rewinding pressure of from 0.14 millipascals (MPa) to 0.24 MPa in one embodiment, and from 0.17 MPa to 0.21 MPa in another embodiment.

In one embodiment, the laminate is used in flexible packaging applications. The package made using the laminate exhibits some advantageous properties including, for example, the package can be further processed (slitting) within a shorter amount of waiting time due to the high green bond of these adhesive formulations, compared to the traditional solventless laminating adhesives. These laminates have good adhesion on various types of barrier films such as Nylon, metallized films, and the like; and thus, the laminate can have a broad range of applications.

For example, the solventless epoxy terminated polyester adhesive systems according to the present invention can be employed in the general to high end of medium performance applications which covers the range of general dry food packaging through hot-fill and boil-in-bag applications. These applications are generally recognized by the U.S. Food and Drug Administration (FDA) as "FDA Condition B" through "FDA Condition H" use applications. Also, the present invention adhesive formulation contains ingredients which are recognized by the FDA as being compliance with the safety regulations of the FDA.

EXAMPLES

The following examples are presented to further illustrate the present invention in detail but are not to be construed as limiting the scope of the claims. Unless otherwise indicated, all parts and percentages are by weight.

Various raw materials or ingredients used in the Inventive Examples (Inv. Ex.) and the Comparative Examples (Comp. Ex.) are explained in Table I as follows:

TABLE 1

| Raw Materials | | |
| --- | --- | --- |
| Ingredient | Brief Description | Supplier |
| adipic acid | dicarboxylic acid monomer | Sigma-Aldrich |
| diethylene glycol | diol monomer | Sigma-Aldrich |
| ethylene glycol | diol monomer | Sigma-Aldrich |
| tetraethylene glycol | diol monomer | Sigma-Aldrich |
| triethylenetetramine | diamine monomer | Sigma-Aldrich |
| sodium acetate | catalyst | Sigma-Aldrich |
| isophthalic acid | dicarboxylic acid monomer | TCI America |
| Unidyme ™ 22 | dimer acid | Kraton Corporation |
| Pripol ™ 1017 | dimer acid | Croda Industrial Chemicals |
| FASCAT ® 9100 | hydroxybutyltin oxide catalyst | Arkema, Inc |
| D.E.R. ™ 731 | diepoxide monomer | Olin Corporation |
| ADCOTE ™577/Coreactant F | solvent-based adhesive | The Dow Chemical Company |

Various films used in the Examples to prepare laminates are described in Table II as follows:

TABLE II

| Films | | |
| --- | --- | --- |
| Film | Brief Description | Supplier |
| PRELAM | A 12-micrometer (48 Gauge) polyester film laminated to 0.00035 mil Aluminum (Al) Foil with ADCOTE ™ 577/Coreactant F at 3.26 grams per square meter (g/m²). The polyester is polyethylene terephthalate (PET). | The Dow Chemical Company |

TABLE II-continued

Films

| Film | Brief Description | Supplier |
|---|---|---|
| Nylon | A biaxially oriented Nylon 6 film having a thickness of 15 μm. | Bemis |
| PE (GF-19) | A high slip low density polyethylene film having a thickness of 38 μm. | Berry Plastics Corp |
| PET (92LBT) | A polyester film with a thickness of 25.4 μm. The polyester is poly(ethylene glycol-terephthalate). | DuPont |
| Metallized PET (met-PET*): | A metallized polyester film having a thickness of 25.4 μm. | FILM Tech Inc., |
| Metallized BOPP (met-BOPP**): | A metallized oriented polypropylene film, heat sealable and having a thickness of 18 μm. | Taghleef Industries Inc. |

Notes for Table II:
*The term "met-PET" means a thin metal layer deposited on top of a polyethylene terephthalate film.
**The term "met-BOPP" means a thin metal layer deposited on top of a bi-axially oriented polypropylene (BOPP) film.

Preparation of Components for the Adhesive Formulation

Synthesis Example 1—Preparation of Carboxylic Acid Terminated Polyester (Acid-PE-1)

In this Synthesis Example 1, a carboxylic acid terminated polyester (Acid-PE-1) was prepared using the ingredients described in Table III. The polyester prepared in this Synthesis Example 1 is a precursor component used to produce the adhesive formulation of the present invention.

Table III

| Item | Ingredient | Charge, (g) |
|---|---|---|
| 1 | isophthalic acid | 1,159.30 |
| 2 | diethylene glycol | 724.30 |
| 3 | ethylene glycol | 398.30 |
| 4 | FASCAT ® 9100 | 0.3888 |
| 5 | adipic acid | 1,526.14 |

Items 1 through 4 described in the above Table III are charged to a reactor at ambient temperature (about 25° C.-30° C.). The reaction mixture is heated slowly to 100° C. under nitrogen ($N_2$) with stirring. The reaction temperature is then increased to 225° C. and held at 225° C., and when about 50% of theoretical water has evolved, the AV and in-process viscosity is monitored. The term "in-process viscosity" herein means the viscosity tested during the condensation reaction. The reactor is maintained at 225° C. until the AV is <about 80. Then the resin is cooled to <125° C. After cooling the resin, Item 5 is added to the resin and the resulting resin mixture is maintained at 125° C.-130° C. for 0.50 hour (hr). The reactor temperature is then slowly increased to 225° C. and maintained at 225° C.; a vacuum at about 435 millimeters of mercury (mm Hg) is applied as needed to decrease the AV to a final target property. The AV and in-process viscosity is monitored; and the reaction is maintained at 225° C. until the AV is about <160. Then the resin is cooled to about 150° C., filtered, and packaged.

The resulting product had the following final properties: an AV of 158.2, a number-average molecular weight ($M_n$) of 550 g/mol, a weight-average molecular weight ($M_w$) of 1,150 g/mol, a Z-average molecular weight ($M_z$) of 1,850 g/mol, a weight fraction of ≤500 Da at 26.0%, a weight fraction of ≤1,000 Da at 55.1%, and a viscosity at 25° C. of 209,000 mPa s.

Synthesis Example 2—Polyester Carboxylic Acid Terminated Polyester (Acid-PE-2)

A carboxylic acid terminated polyester (Acid-PE-2) is prepared using the same procedure as described in Synthesis Example 1 for preparing the carboxylic acid terminated polyester (Acid-PE-1) except that in this Synthesis Example 2, the ingredients described in Table IV are used; and the AV prior to the addition of adipic acid is about 131.

TABLE IV

| Item | Ingredient | Charge, (g) |
|---|---|---|
| 1 | isophthalic acid | 1,165.6 |
| 2 | diethylene glycol | 748.2 |
| 3 | ethylene glycol | 419.4 |
| 4 | FASCAT ® 9100 | 0.40 |
| 5 | adipic acid | 1,534.8 |

Items 1 through 4 described in Table IV above were charged to a reactor at ambient temperature. The reaction mixture was heated slowly to 100° C. under $N_2$ with stirring. The reaction temperature was then increased to 220° C. and held at 220° C., when about 50% of theoretical water evolved, the AV and in-process viscosity were monitored. The reactor was maintained at 220° C. until the AV was about <20. Then, the resin was cooled to <125° C. After cooling the resin, Item 5 was added to the resin, and the resin mixture was maintained at 125° C.-130° C. for 0.50 hr. Then the reactor temperature was slowly increased to 225° C. and maintained at 225° C. to decrease the AV to final target property. The AV and in-process viscosity were monitored; and reaction was maintained at 225° C. until the AV was about <135. The resin was then cooled to about 150° C., filtered and packaged.

The resulting product had the following final properties: an AV of 131 and a viscosity at 25° C. of 237,300 mPa·s.

Synthesis Example 3—Preparation of Carboxylic Acid Terminated Polyester (Acid-PE-3)

A carboxylic acid terminated polyester (Acid-PE-3) is prepared using the same procedure as described in Synthesis Example 1 for preparing the carboxylic acid terminated polyester (Acid-PE-1) except that in this Synthesis Example 3, the ingredients described in Table V are used; and the AV prior to the addition of adipic acid is about 153.

TABLE V

| Item | Ingredient | Charge, (g) |
|---|---|---|
| 1 | isophthalic acid | 1,227.8 |
| 2 | tetraethylene glycol | 1,269.8 |
| 3 | ethylene glycol | 423.5 |

TABLE V-continued

| Item | Ingredient | Charge, (g) |
|---|---|---|
| 4 | FASCAT ® 9100 | 0.5 |
| 5 | adipic acid | 1,619.9 |

Items 1 through 4 described in Table V above were charged to a reactor at ambient temperature. The reaction mixture was heated slowly to 100° C. under $N_2$ with stirring. The reaction temperature was then increased to 220° C. and held at 220° C., when about 50% if theoretical water evolved the AV and in-process viscosity were monitored. The reactor was maintained at 220° C. until AV was <about 60. The resin was cooled to <125° C. and then Item 5 was added, the resin mixture was maintained at 125° C.-130° C. for 0.50 hr. The reactor temperature was slowly increased to 225° C. and then maintained at 225° C. to decrease AV to final target property. The AV and in-process viscosity were monitored; reaction was maintained at 225° C. until AV is <about 160. The resin was cooled to about 150° C., filtered and packaged.

The resulting product had the following final properties: an AV of 153, a $M_n$ of 939 g/mol, a $M_w$ of 1,707 g/mol, a polydispersity of 1.82, a weight fraction of ≤500 g/mol at 13.0%, a weight fraction of ≤1,000 g/mol 33.7%, and a viscosity at 60° C. of 1,440 mPa·s.

Synthesis Example 4—Preparation of Carboxylic Acid Terminated Polyester (Acid-PE-4)

A carboxylic acid terminated polyester (Acid-PE-4) is prepared using the same procedure as described in Synthesis Example 1 for preparing the carboxylic acid terminated polyester (Acid-PE-1) except that in this Synthesis Example 4, the ingredients described in Table VI are used; and the AV prior to the addition of adipic acid is about 149.

TABLE VI

| Item | Ingredient | Charge, (g) |
|---|---|---|
| 1 | isophthalic acid | 581.7 |
| 2 | tetraethylene gycol | 1134.9 |
| 3 | FASCAT ® 9100 | 0.3 |
| 4 | adipic acid | 764.7 |

Items 1 through 3 described in Table VI above were charged to a reactor at ambient temperature. The reaction mixture was heated slowly to 100° C. under $N_2$ with stirring. The reaction temperature was then increased to 220° C. and held at 220° C., when about 50% if theoretical water evolved the AV and in-process viscosity were monitored. The reactor was maintained at 220° C. until AV was <about 60. The resin was cooled to <125° C. and then Item 4 was added, the resin mixture was maintained at 125° C.-130° C. for 0.50 hr. The reactor temperature was slowly increased to 225° C. and then maintained at 225° C. to decrease AV to final target property. The AV and in-process viscosity were monitored; reaction was maintained at 225° C. until AV is <about 160. Cooled resin to about 150° C., filtered and packaged.

The resulting product had the following final properties: an AV of 149, a $M_n$ of 994 g/mol, a $M_w$ of 1,888 g/mol, a polydispersity of 1.90, a weight fraction of ≤500 g/mol at 11.3%, a weight fraction of ≤1,000 g/mol at 27.4%, and a viscosity at 60° C. of 1,052 mPa·s.

Synthesis Example 5—Preparation of Epoxy Terminated Polyester (ET-PE-1)

In this Synthesis Example 5, an epoxy terminated polyester (ET-PE-1) is prepared by charging into a reactor at ambient temperature, D.E.R.™ 731 epoxy diluent (diglycidyl ether of 1,4-butanediol), the acid terminated polyester (Acid-PE-1) of Synthesis Example 1, and a catalyst as described in Table VII.

TABLE VII

| Item | Monomer/Intermediate | Charge, (g) |
|---|---|---|
| 1 | D.E.R. ™ 731 | 540.0 |
| 2 | polyester resin Acid-PE-1 | 567.1 |
| 3 | sodium acetate | 0.5068 |

The reactor went through four $N_2$ purge/vacuum cycles and was kept under steady $N_2$ flow. The resin mixture was slowly heated to a temperature of from 135° C. to 140° C. The reaction was maintained at 135° C.-140° C. for about 0.50 hr and then heated to 150° C.-155° C. and maintained at 150° C.-155° C. for about 1.5 hr to 2 hr; and then, the AV and in-process viscosity was monitored. The reaction was maintained at 150° C.-155° C. and the AV and in-process viscosity was monitored until the AV was <1.0. Thereafter, the resin was transferred and packaged once the AV was <1.0.

The resulting product had the following final properties: an AV of 0.19, an EEW of 487 g/mol, and a viscosity at 25° C. of 13,130 mPa·s. Under SEC analysis, the product had: a $M_n$ of 1,340 g/mol, a $M_w$ of 6,322 g/mol, a polydispersity of 4.72, a weight fraction of <500 g/mol at 5.6%, and a weight fraction of <1,000 g/mol at 19.2%.

Synthesis Example 6—Preparation of Epoxy Terminated Polyester (ET-PE-2)

In this Synthesis Example 6, an epoxy terminated polyester (ET-PE-2) is prepared by charging into a reactor at ambient temperature, D.E.R.™ 731 epoxy diluent (diglycidyl ether of 1,4-butanediol), the acid terminated polyester (Acid-PE-2) of Synthesis Example 2, and a catalyst as described in Table VIII.

TABLE VIII

| Item | Monomer/Intermediate | Charge, (g) |
|---|---|---|
| 1 | D.E.R. ™ 731 | 609.8 |
| 2 | polyester resin Acid-PE-2 | 972.3 |
| 3 | sodium acetate | 0.60 |

The reactor went through four $N_2$ purge/vacuum cycles and was kept under steady $N_2$ flow. The resin mixture was slowly heated to 135° C.-140° C. The reaction was maintained at 135° C.-140° C. for about 0.50 hr and then heated to 150° C.-155° C. and maintained at 150° C.-155° C. for about 1.5 hr to 2 hr and then monitored AV and in-process viscosity. The reaction was maintained at 150° C.-155° C. and monitored AV and in-process viscosity until AV<1.0. The resin was transferred and packaged once AV is <1.0.

The resulting product had the following final properties: an AV of 0.5, an EEW of 941.1 g/mol, a viscosity at (@) 25° C. of 112,400 mPa·s. Under SEC analysis, the product had: a $M_n$ of 2,787 g/mol, a $M_w$ of 13,028 g/mol, a $M_z$ of 38,951 g/mol, a polydispersity of 4.67, a weight fraction of <500 g/mol at 1.1%, and a weight fraction of <1,000 g/mol at 7.8%.

Synthesis Example 7—Preparation of Epoxy Terminated Polyester (ET-PE-3)

In this Synthesis Example 7, an epoxy terminated polyester (ET-PE-3) is prepared by charging into a reactor at ambient temperature, D.E.R.™ 731 epoxy diluent (diglycidyl ether of 1,4-butanediol), the acid terminated polyester (Acid-PE-3) of Synthesis Example 3, and a catalyst as described in Table IX.

TABLE IX

| Item | Monomer/Intermediate | Charge, (g) |
|---|---|---|
| 1 | D.E.R. ™ 731 | 653.8 |
| 2 | polyester resin Acid PE-3 | 900.0 |
| 3 | sodium acetate | 0.58 |

The reactor went through four $N_2$ purge/vacuum cycles and was kept under steady $N_2$ flow. The resin mixture was slowly heated to 135° C.-140° C. The reaction was maintained at 135° C.-140° C. for about 0.50 hr and then heated to 150-155° C. and maintained at 150° C.-155° C. for about 1.5 hr to 2 hr and then monitored AV and in-process viscosity. The reaction was maintained at 150° C.-155° C. and monitored AV and in-process viscosity until the AV is <1.0. The resin was transferred and packaged once AV is <1.0.

The resulting product had the following final properties: an AV of 0.27, an EEW of 909.5 g/mol, a viscosity @ 75° C. of 1,434 mPa·s. Under SEC analysis, the product had: a $M_n$ of 1,571 g/mol, a $M_w$ of 10,817 g/mol, a polydispersity of 6.81, a weight fraction of <500 g/mol at 8.9%, and a weight fraction of <1,000 g/mol at 16.5%.

Synthesis Example 8—Preparation of Epoxy Terminated Polyester (ET-PE-4)

In this Synthesis Example 8, an epoxy terminated polyester (ET-PE-4) is prepared by charging into a reactor at ambient temperature, D.E.R.™ 731 epoxy diluent (diglycidyl ether of 1,4-butanediol), the acid terminated polyester (Acid-PE-4) of Synthesis Example 4, and a catalyst as described in Table X.

TABLE X

| Item | Monomer/Intermediate | Charge, (g) |
|---|---|---|
| 1 | D.E.R. ™ 731 | 355.6 |
| 2 | polyester resin Acid-PE-4 | 500.0 |
| 3 | sodium acetate | 0.31 |

The reactor went through four $N_2$ purge/vacuum cycles and was kept under steady $N_2$ flow. The resin mixture was slowly heated to 135° C.-140° C. The reaction was maintained at 135° C.-140° C. for about 0.50 hr and then heated to 150° C.-155° C. and maintained at 150° C.-155° C. for about 1.5 hr to 2 hr and then monitored AV and in-process viscosity. The reaction was maintained at 150-155° C. and monitored AV and in-process viscosity until AV<1.0. The resin was transferred and packaged once AV is <1.0.

The resulting product had the following final properties: an AV of 0.90, an EEW of 869.5 g/mol, and a viscosity @ 75° C. of 1,133 mPa·s. Under SEC analysis, the product had: a $M_n$ of 1,571 g/mol, a $M_w$ of 10,541 g/mol, a polydispersity of 6.72, a weight fraction of <500 g/mol at 8.9%, and a weight fraction of <1,000 g/mol at 15.1%.

Synthesis Example 9—Preparation of Amine Curative (AC-1)

In this Synthesis Example 9, an amine curative (AC-1) is prepared by charging into a reactor at ambient temperature, Unidyme™ 22 dimer acid (AV=192.9) and triethlyenetetramine as described in Table XI.

TABLE XI

| Item | Monomer/Intermediate | Charge, (g) |
|---|---|---|
| 1 | Unidyme ™ 22 | 810.77 |
| 2 | triethylenetetramine | 448.71 |

The reactor went through four $N_2$ purge/vacuum cycles and was kept under steady $N_2$ flow. The resin mixture was slowly heated to 150° C. The reaction was maintained at 150° C.-155° C. for about 0.50 hr and then heated to 200° C.-205° C. and maintained at 200° C.-205° C. for about 1.5 hr to 2 hr and then monitored water evolution. The reaction was maintained at 200° C.-205° C. until no more water distilled out from the reactor. The resin was transferred and packaged at 150° C.

The resulting product had the following final properties: an amine number (IPA titration) of 169.64, a viscosity @ 25° C. of 54,625 mPa s, and a viscosity @ 40° C. of 12,975 mPa s.

Synthesis Example 10—Preparation of Amine Curative (AC-2)

In this Synthesis Example 10, an amine curative (AC-2) is prepared by charging into a reactor at ambient temperature, PRIPOL™ 1017 dimer acid and triethlyenetetramine as described in Table XII.

TABLE XII

| Item | Monomer/Intermediate | Charge, (g) |
|---|---|---|
| 1 | Pripol ™ 1017 | 576.5 |
| 2 | triethylenetetramine | 293.3 |

The reactor went through four $N_2$ purge/vacuum cycles and was kept under steady $N_2$ flow. The resin mixture was slowly heated to 150° C. The reaction was maintained at 150° C.-155° C. for about 0.50 hr and then heated to 200° C.-205° C. and maintained at 200° C.-205° C. for about 1.5 hr to 2 hr and then monitored water evolution. The reaction was maintained at 200° C.-205° C. until no more water distilled out from the reactor. The resin was transferred and packaged at 150° C.

The resulting product had the following final properties: an amine number (IPA titration) of 352.3, and a viscosity @ 75° C. of 1,417 mPa·s. Under SEC analysis, the product had: a $M_n$ of 567 g/mol, a $M_w$ of 1,248 g/mol, a polydispersity of 2.20, a weight fraction of <500 g/mol at 29.2%, and a weight fraction of <1,000 g/mol at 48.8%.

General Procedures for Adhesive Lamination

The plastic films were corona treated at a lower level power at about 0.14 kilowatts (kW) before lamination. The epoxy terminated polyesters and the amine curative were first dissolved at designated solids contents (10%-25%) in methyl ethyl ketone (MEK). There were two types of methods being adopted to prepare the laminates: (I) the conventional standard method; and (II) the one-shot method.

(I) The Standard Method

For the standard method, typically, the epoxy terminated polyester solutions were premixed with designated amounts of the amine curative solution (see Table XIII below), and then the mixture was hand coated onto the primary film using a Meyer rod (#0), then dried for 1 min in the oven with temperature set at 80° C. The primary film was laminated to the secondary film on an oil-based laminator with a nip temperature set at 82° C. The coating weight was controlled at about 1.58 g/m² to 1.63 g/m². At least five laminates (20.3 cm×27.9 cm) were prepared for each formulation with bond strip within the laminate to facilitate bond strength testing. The laminates were placed under 0.45 kg-0.9 kg weight in the order to apply equivalent pressure across the laminate sample, and the laminates were allowed to cure at room temperate (about 25° C.) for 2 weeks.

(II) The One-Shot Method

For the one-shot method, the epoxy terminated polyester solutions were hand coated onto the primary film; meanwhile, the amine curative solution was hand coated to the secondary film. After drying for 1 min in an 80° C. oven, the primary and secondary films were laminated together in a similar fashion as that for the standard method. The coating weight was controlled at 1.8 g/m². The following curing protocol was the same as that for the standard method.

Bond Strength Measurement

The 900 T-peel test was done on laminate samples cut to 1 inch (2.54 cm) wide strips and pulled on a Thwing Albert™ QC-3A peel tester equipped with a 50 N loading cell at a rate of inch/min (25.4 cm/min). Bond strength measurements in g/lin (grams/linear inch) are converted to N/15 mm by multiplying be a conversion factor of 0.0057915. When the two films in the laminate separated (peeled), the average of the force during the pull was recorded. If one of the films stretched or broke, the maximum force or force at break was recorded. The values were the average of three separate sample strips. The failure mode (FM) or mode of failure (MOF) was recorded as follows:

"FS" stands for film stretch.

"FT" stands for film tears or breaks.

"DL" stands for delaminated wherein the secondary film separated from the primary film.

"AT" stands for adhesive transfer (adhesive fails to adhere to the primary film and is transferred to the secondary film).

"AS" stands for adhesive split or cohesive failure (adhesive is found on both primary and secondary film).

The examples comparing the conventional standard lamination process and the one-shot method yield comparable performance or slightly better performance via the one-shot method.

Examples 1-5 and Comparative Examples A-E

Tables XIII and XIV which follow summarize the adhesive mix ratio compositions examined.

TABLE XIII

| | Adhesive Compositions | | | | |
|---|---|---|---|---|---|
| Adhesive Component | Example 1 | Example 2 | Example 3 | Example 4 | Example 5 |
| ET-PE-1 | 30.26 | 30.26 | 27.4 | 20.6 | |
| ET-PE-2 | | | | | |
| ET-PE-3 | | | | | |
| ET-PE-4 | | | | | 53.0 |
| AC-1 | 9.74 | 9.9 | | | |
| AC-2 | | | 8.0 | 8.1 | 8.1 |
| ET-PE:Curative, Mix Ratio | 12.43:4.0 | 12.23:4.0 | 13.7:4.0 | 10.3:4.1 | 26.5:4.1 |
| Epoxy:Amine, Index Ratio | 1.08 | 1.06 | 1.12 | 0.84 | 1.12 |

TABLE XIV

| | Adhesive Compositions | | | | |
|---|---|---|---|---|---|
| Adhesive Component | Example 6 | Comparative Example 7 | Comparative Example 8 | Comparative Example 9 | Comparative Example 10 |
| ET-PE-1 | | | | | |
| ET-PE-2 | | 51.2 | 38.5 | | |
| ET-PE-3 | | | | 49.0 | 36.8 |
| ET-PE-4 | 38.5 | | | | |
| AC-1 | | | | | |
| AC-2 | 8.0 | 8.0 | 8.0 | 8.0 | 8.1 |
| ET-PE:Curative, Mix Ratio | 19.3:4.0 | 25.6:4.0 | 19.3:4.0 | 24.5:4.0 | 18.4:4.1 |
| Epoxy:Amine, Index Ratio | 0.84 | 1.12 | 0.84 | 1.12 | 0.84 |

It should be noted that epoxy terminated polyester resins based on or in part on tetraethylene glycol (ET-PE-3 and ET-PE-4) are Comparative Examples. The Comparative Examples demonstrate that the use of tetraethylene glycol which is outside the scope of the present invention and the Comparative Examples exhibit poorer adhesion performance than those based upon the epoxy terminated polyester (ET-PE-1 and ET-PE-2) resins of the present invention; and those resins of U.S. Pat. Nos. 9,751,977 and 9,752,066.

Tables XV through XVIII summarize the adhesion performance for the different adhesive systems in different laminate constructions evaluated employing the standard lamination process. The laminate of Example 1 has a coating weight of 1.63 g/m², laminates 3 through 10 had a coating weight of 1.58 g/m².

Table XV summarizes the adhesion performance of laminates with a construction based on PET//PE (GF-19) employing the standard coating process.

TABLE XV

PET//PE (GF-19) Adhesion Performance

Bond Strength (N/15 mm) and Mode of Failure (MOF)

| Example No. | 1 Day N/15 mm | MOF | 2 Days N/15 mm | MOF | 3 Days N/15 mm | MOF | 7 Days N/15 mm | MOF | 14 Days N/15 mm | MOF |
|---|---|---|---|---|---|---|---|---|---|---|
| 1 | 2.88 | AS | 3.01 | AS | 3.14 | AS | 2.75 | AT | 2.64 | AT |
| 3 | 0.87 | AT | 1.02 | AT | 1.12 | AT | 1.38 | AT | 1.51 | AT |
| 4 | 1.16 | AT | 1.33 | AT | 1.37 | AT | 1.75 | AT | 1.81 | AT |
| 5 | 1.28 | AT | 1.42 | AT | 1.44 | AT | 1.57 | AT | 1.60 | AT |
| 6 | 1.50 | AT | 1.66 | AT | 1.62 | AT | 1.73 | AT | 1.80 | AT |
| 7 (Comp. Ex.) | 0.91 | AT | 1.00 | AT | 1.17 | AT | 1.24 | AT | 1.35 | AT |
| 8 (Comp. Ex.) | 0.98 | AT | 1.03 | AT | 1.40 | AT | 1.44 | AT | 1.56 | AT |
| 9 (Comp. Ex.) | 0.63 | AT | 0.71 | AT | 0.78 | AT | 0.81 | AT | 0.88 | AT |
| 10 (Comp. Ex.) | 0.79 | AT | 1.02 | AT | 1.07 | AT | 1.26 | AT | 1.23 | AT |

TABLE XVI

Nylon//PE (G-19) Adhesion Performance

Bond Strength (N/15 mm) and Mode of Failure (MOF)

| Example No. | 1 Day N/15 mm | MOF | 2 Days N/15 mm | MOF | 3 Days N/15 mm | MOF | 7 Days N/15 mm | MOF | 14 Days N/15 mm | MOF |
|---|---|---|---|---|---|---|---|---|---|---|
| 1 | 3.53 | FT | 2.94 | FT | 2.97 | FT | 2.73 | FT | 3.30 | FT |
| 3 | 1.29 | AS | 1.66 | AS | 1.85 | AS | 2.00 | AS | 2.06 | AS |
| 4 | 1.48 | AS | 1.63 | AS | 2.00 | AS | 2.22 | AS | 3.15 | AS/FT |
| 5 | 1.31 | AS | 1.56 | AS | 1.78 | AS | 1.82 | AS | 2.22 | AS |
| 6 | 1.80 | AS | 1.96 | AS | 2.24 | AS | 2.21 | AS | 2.30 | AS/FT |
| 7 (Comp. Ex.) | 1.30 | AS | 1.34 | AS | 1.37 | AS | 1.75 | AS | 2.14 | AS |
| 8 (Comp. Ex.) | 1.45 | AS | 1.55 | AS | 1.58 | AS | 1.93 | AS | 2.19 | AS |
| 9 (Comp. Ex.) | 0.62 | AS | 0.80 | AS | 1.10 | AS | 1.26 | AS | 1.31 | AS |
| 10 (Comp. Ex.) | 0.61 | AS | 1.08 | AS | 1.27 | AS | 1.40 | AS | 1.63 | AS |

TABLE XVII

PRELAM//PET Adhesion Performance

Bond Strength (N/15 mm) and Mode of Failure (MOF)

| Example No. | 1 Day N/15 mm | MOF | 2 Days N/15 mm | MOF | 3 Days N/15 mm | MOF | 7 Days N/15 mm | MOF | 14 Days N/15 mm | MOF |
|---|---|---|---|---|---|---|---|---|---|---|
| 1 | 1.03 | AT | 0.83 | AT | 0.80 | AT | 0.98 | AT | 0.85 | AT |
| 3 | 0.32 | AS | 0.55 | AS | 0.53 | AS/AT | 0.62 | AS/AT | 0.80 | AS/AT |

TABLE XVII-continued

PRELAM//PET Adhesion Performance

Bond Strength (N/15 mm) and Mode of Failure (MOF)

| Example No. | 1 Day N/15 mm | MOF | 2 Days N/15 mm | MOF | 3 Days N/15 mm | MOF | 7 Days N/15 mm | MOF | 14 Days N/15 mm | MOF |
|---|---|---|---|---|---|---|---|---|---|---|
| 4 | 0.46 | AS | 0.62 | AS | 0.73 | AS/AT | 0.72 | AS/AT | 0.90 | AS/AT |
| 5 | 0.54 | AS | 0.56 | AS | 0.60 | AS/AT | 0.77 | AS/AT | 0.97 | AS/AT |
| 6 | 0.67 | AS | 0.61 | AS | 1.07 | AS/AT | 0.98 | AS/AT | 1.12 | AS/AT |
| 7 (Comp. Ex.) | 0.28 | AS | 0.49 | AS | 0.56 | AS/AT | 0.65 | AS/AT | 0.72 | AS/AT |
| 8 (Comp. Ex.) | 0.41 | AS | 0.54 | AS | 0.57 | AS/AT | 0.63 | AS/AT | 0.86 | AS/AT |
| 9 (Comp. Ex.) | 0.16 | AS | 0.3 | AS | 0.45 | AS/AT | 0.51 | AS/AT | 0.74 | AS/AT |
| 10 (Comp. Ex.) | 0.35 | AS | 0.48 | AS | 0.53 | AS/AT | 0.58 | AS/AT | 0.74 | AS/AT |

TABLE XVIII

PRELAM//PE (GF-19) Adhesion Performance

Bond Strength (N/15 mm) and Mode of Failure (MOF)

| Example No. | 1 Day N/15 mm | MOF | 2 Days N/15 mm | MOF | 3 Days N/15 mm | MOF | 7 Days N/15 mm | MOF | 14 Days N/15 mm | MOF |
|---|---|---|---|---|---|---|---|---|---|---|
| 1 | 1.70 | AT | 1.38 | AT | 1.39 | AT | 1.77 | AT | 1.75 | AT |
| 3 | 1.48 | AS | 1.45 | AT/AS | 1.68 | AT/AS | 1.69 | AT/AS | 2.17 | AT/AS |
| 4 | 1.51 | AS | 1.67 | AT/AS | 1.85 | AT/AS | 1.95 | AT/AS | 2.40 | AT/AS |
| 5 | 1.87 | AS | 1.84 | AT/AS | 1.82 | AT/AS | 1.89 | AT/AS | 1.96 | AT/AS |
| 6 | 1.93 | AS | 2.33 | AT/AS | 2.25 | AT/AS | 2.02 | AT/AS | 2.23 | AT/AS |
| 7 (Comp. Ex.) | 1.31 | AS | 1.34 | AS/AT | 1.64 | AT/AS | 1.79 | AT/AS | 1.93 | AT/AS |
| 8 (Comp. Ex.) | 1.64 | AS | 1.81 | AS/AT | 1.88 | AT/AS | 2.03 | AT/AS | 1.92 | AT/AS |
| 9 (Comp. Ex.) | 1.15 | AS | 1.34 | AS/AT | 1.55 | AT/AS | 1.58 | AT/AS | 1.55 | AT/AS |
| 10 (Comp. Ex.) | 1.15 | AS | 1.66 | AS/AT | 1.73 | AT/AS | 164 | AT/AS | 1.60 | AT/AS |

Tables XIX through XXII summarize the adhesion performance for the different adhesive systems in different laminate constructions evaluated employing the one-shot method. Laminate of Example 2 was prepared by coating the epoxy terminated polyester resin (ET-PE-1) onto the secondary film at coating weight of 1.22 g/m² and the amine curative (AC-1) on the primary film at a coating weight of about 0.41 g/m², (the coating weight of the ET-PE-1/AC-1 corresponds to a mix ratio of the adhesive 30.26:9.9 or 75.3:24.7) yielding an adhesive coating weight of 0.41 g/m² in the final laminate. Laminates of Example 3 through 10 were prepared in which the Epoxy Terminated Polyester (ET-PE-1, ET-PE-2, ET-PE-3 or ET-PE-4) was coated on the primary film and the Amine Curative (AC-2) was coated on the secondary film to yield an adhesive coating weight of 1.79 g/m², the coating of each component was adjusted to yield the proper coating weight in agreement with the mix ratio of the adhesive.

Table XIX summarizes the adhesion performance of laminates with a construction based on PET//PE (G-19) employing the one-shot method.

TABLE XIX

PET//PE (GF-19) Adhesion Performance

Bond Strength (N/15 mm) and Mode of Failure (MOF)

| Example No. | 1 Day N/15 mm | MOF | 2 Days N/15 mm | MOF | 3 Days N/15 mm | MOF | 7 Days N/15 mm | MOF | 14 Days N/15 mm | MOF |
|---|---|---|---|---|---|---|---|---|---|---|
| 2 | 2.66 | AS | 2.70 | AS | 3.27 | AS | 3.24 | AT | 2.86 | AT |
| 3 | 0.37 | AS | 0.48 | AS | 0.78 | AS | 0.88 | AS | 0.86 | AS |
| 4 | 0.60 | AS | 0.58 | AS | 1.40 | AS | 1.41 | AS | 1.51 | AS/AT |
| 5 | 0.88 | AS | 1.07 | AS | 1.20 | AS | 1.29 | AS | 1.42 | AS/AT |
| 6 | 1.22 | AS | 1.21 | AS | 1.36 | AS | 1.56 | AS | 1.48 | AS/AT |

TABLE XIX-continued

PET//PE (GF-19) Adhesion Performance

| | Bond Strength (N/15 mm) and Mode of Failure (MOF) | | | | | | | | |
|---|---|---|---|---|---|---|---|---|---|
| | 1 Day | | 2 Days | | 3 Days | | 7 Days | | 14 Days | |
| Example No. | N/15 mm | MOF | N/15 mm | MOF | N/15 mm | MOF | N/15 mm | MOF | N/15 mm | MOF |
| 7 (Comp. Ex.) | 0.73 | AS | 0.78 | AS | 0.95 | AS | 1.05 | AS | 1.16 | AS/AT |
| 8 (Comp. Ex.) | 0.65 | AS | 0.85 | AS | 0.95 | AS | 1.15 | AS | 1.30 | AS/AT |
| 9 (Comp. Ex.) | 0.48 | AS | 0.43 | AS | 0.74 | AS | 0.93 | AS | 1.09 | AS/AT |
| 10 (Comp. Ex.) | 0.47 | AS | 0.68 | AS | 0.71 | AS | 1.02 | AS | 1.05 | AS/AT |

Table XX summarizes the adhesion performance of laminates with a construction based on Nylon//PE (G-19) employing the one-shot method.

TABLE XX

Nylon//PE (GF-19) Adhesion Performance

| | Bond Strength (N/15 mm) and Mode of Failure (MOF) | | | | | | | | |
|---|---|---|---|---|---|---|---|---|---|
| | 1 Day | | 2 Days | | 3 Days | | 7 Days | | 14 Days | |
| Example No. | N/15 mm | MOF | N/15 mm | MOF | N/15 mm | MOF | N/15 mm | MOF | N/15 mm | MOF |
| 2 | 2.95 | FT | 2.95 | FT | 3.28 | FT | 3.34 | FT | 3.23 | FT |
| 3 | 0.73 | AS | 0.78 | AS | 0.89 | AS | 1.31 | AS | 1.41 | AS |
| 4 | 0.83 | AS | 0.83 | AS | 1.20 | AS | 1.80 | AS | 2.25 | AS |
| 5 | 0.75 | AS | 0.86 | AS | 1.23 | AS | 1.33 | AS | 1.68 | AS |
| 6 | 1.05 | AS | 1.22 | AS | 1.35 | AS | 1.42 | AS | 1.62 | AS |
| 7 (Comp. Ex.) | 0.68 | AS | 0.86 | AS | 1.05 | AS | 1.25 | AS | 1.50 | AS |
| 8 (Comp. Ex.) | 0.90 | AS | 0.99 | AS | 1.00 | AS | 1.23 | AS | 1.47 | AS |
| 9 (Comp. Ex.) | 0.48 | AS | 0.80 | AS | 0.83 | AS | 0.98 | AS | 1.07 | AS |
| 10 (Comp. Ex.) | 0.75 | AS | 0.97 | AS | 1.04 | AS | 1.27 | AS | 1.40 | AS |

Table XXI summarizes the adhesion performance of laminates with a construction based upon PRELAM (Al Backed Foil)//PET, and PRELAM (Al Backed Foil) employing the one-shot method.

TABLE XXI

PRELAM//PET Adhesion Performance

| | Bond Strength (N/15 mm) and Mode of Failure (MOF) | | | | | | | | |
|---|---|---|---|---|---|---|---|---|---|
| | 1 Day | | 2 Days | | 3 Days | | 7 Days | | 14 Days | |
| Example No. | N/15 mm | MOF | N/15 mm | MOF | N/15 mm | MOF | N/15 mm | MOF | N/15 mm | MOF |
| 2 | 0.94 | AT | 0.62 | AT | 0.69 | AT | 0.79 | AT | 0.80 | AT |
| 3 | 0.34 | AS | 0.80 | AS | 1.31 | AS | 1.22 | AS/AT | 1.48 | AS/AT |
| 4 | 0.44 | AS | 1.29 | AS | 1.42 | AS | 1.55 | AS/AT | 1.63 | AS/AT |
| 5 | 0.67 | AS | 0.85 | AS | 0.98 | AS | 1.16 | AS/AT | 1.25 | AS/AT |
| 6 | 0.75 | AS | 0.93 | AS | 1.04 | AS | 1.19 | AS/AT | 1.25 | AS/AT |
| 7 (Comp. Ex.) | 0.56 | AS | 0.68 | AS | 0.92 | AS | 1.01 | AS | 1.04 | AS/AT |
| 8 (Comp. Ex.) | 0.58 | AS | 0.78 | AS | 0.94 | AS | 1.11 | AS | 1.34 | AS/AT |
| 9 (Comp. Ex.) | 0.27 | AS | 0.45 | AS | 0.54 | AS | 0.78 | AS | 0.78 | AS |
| 10 (Comp. Ex.) | 0.33 | AS | 0.58 | AS | 0.65 | AS | 0.82 | AS | 0.90 | AS |

Table XXII summarizes the adhesion performance of laminates with a construction based on PRELAM (Al Backed Foil)//PE (G-19) employing the one-shot method.

TABLE XXII

PRELAM//PE (GF-19) Adhesion Performance

Bond Strength (N/15 mm) and Mode of Failure (MOF)

| Example No. | 1 Day N/15 mm | MOF | 2 Days N/15 mm | MOF | 3 Days N/15 mm | MOF | 7 Days N/15 mm | MOF | 14 Days N/15 mm | MOF |
|---|---|---|---|---|---|---|---|---|---|---|
| 2 | 1.82 | AT | 1.42 | AT | 1.29 | AT | 1.73 | AT | 1.60 | AT |
| 3 | 0.13 | AS | 0.89 | AS | 0.93 | AS | 0.96 | AS | 1.31 | AS |
| 4 | 0.56 | AS | 1.29 | AS | 1.42 | AS | 1.48 | AS | 1.64 | AS |
| 5 | 0.95 | AS | 1.26 | AS | 1.64 | AS | 1.60 | AS | 1.67 | AS |
| 6 | 1.16 | AS | 1.51 | AS | 1.56 | AS | 1.60 | AS | 1.70 | AS |
| 7 (Comp. Ex.) | 0.52 | AS | 0.78 | AS | 1.01 | AS | 1.16 | AS | 1.18 | AS |
| 8 (Comp. Ex.) | 0.79 | AS | 1.09 | AS | 1.18 | AS | 1.15 | AS | 1.33 | AS |
| 9 (Comp. Ex.) | 0.35 | AS | 0.74 | AS | 0.93 | AS | 1.06 | AS | 1.05 | AS |
| 10 (Comp. Ex.) | 0.52 | AS | 0.93 | AS | 1.08 | AS | 1.14 | AS | 1.12 | AS |

What is claimed is:

1. A process of making a laminate comprising the steps of:
(I) providing an epoxy terminated polyester that is a reaction product consisting of
    (a) a carboxylic acid terminated polyester,
    (b) a diglycidyl ether of 1,4-butanediol, and
    (c) optional solvent;
(II) providing a curative composition at a mix ratio of the epoxy terminated polyester component to the curative composition from 100:15 to 100:40, the curative composition is a reaction product consisting of
    (a) a dimer acid, and
    (b) a diamine selected from the group consisting of ethylenediamine, diethylenetriamine, triethylenetriamine, tetraethylenepentamine, piperazine, aminoethylpiperazine, isophorone diamine, xylylenediamine, and mixtures thereof;
(III) coating a first film substrate with the epoxy terminated polyester;
(IV) coating a second film substrate with the curative composition; and
(V) laminating the first film and second film together;
    wherein the epoxy terminated polyester on the first film contacts the curative composition on the second film;
    wherein an in situ reaction occurs between the epoxy terminated polyester on the first film and the curative composition on the second film to form a bond between the first film and the second film, the bond having an adhesive strength from 0.5N/15 mm to 4 N/15 mm after 14 days cure; and
    wherein a bonded laminate structure consisting of a first film and a second film with a bond layer of laminating adhesive disposed in between the first film and the second film is formed, and the laminating adhesive (1) is free of isocyanate and is free of bisphenol-A and (2) consists of (i) the epoxy terminated polyester and (ii) the curative composition.

2. The process of claim 1 comprising
contacting the epoxy terminated polyester and the curative composition at an application temperature from 40° C. to 60° C.; and
forming a laminating adhesive having a viscosity at the application temperature from 1,000 mPa·s to less than or equal to 5,000 mPa·s.

3. The process of claim 2 comprising coating a layer of the epoxy terminated polyester onto the first film substrate at a thickness from 0.5 microns to 2.5 microns.

4. The process of claim 3 comprising coating a layer of the curative composition onto the second film substrate at a thickness from 0.5 microns to 2.5 microns.

5. The process of claim 4 comprising forming a bond layer of laminating adhesive having a thickness from 1 micron to 5 microns.

6. The process of claim 1 wherein the carboxylic acid terminated polyester is a reaction product of
    (i) isophthalic acid,
    (ii) diethylene glycol,
    (iii) ethylene glycol, and
    (iv) adipic acid.

7. The process of claim 1 wherein the carboxylic acid terminated polyester is a reaction product of
    (i) isophthalic acid,
    (ii) tetraethylene glycol,
    (iii) adipic acid, and
    (iv) optionally ethylene glycol.

8. The process of claim 7 wherein the carboxylic acid terminated polyester is a reaction product of
    (i) isophthalic acid,
    (ii) tetraethylene glycol,
    (iii) adipic acid, and
    (iv) ethylene glycol.

9. The process of claim 1 wherein the curative composition has an amine number from 150 to 420.

10. The process of claim 9 wherein the curative composition has a viscosity at 75° C. from 1000 mPa·s to 10,000 mPa·s.

11. A process of making a laminate comprising:
(I) providing an epoxy terminated polyester that is free of bisphenol-A, the epoxy terminated polyester is a reaction product consisting of
    (a) a carboxylic acid terminated polyester,
    (b) a diglycidyl ether of 1,4-butanediol, and
    (c) optional solvent;
(II) providing a curative composition that is free of isocyanate;

(III) coating a first film substrate with the epoxy terminated polyester;
(IV) coating a second film substrate with the curative composition; and
(V) laminating the first film and second film together;
providing a mix ratio of the epoxy terminated polyester component to the curative composition from 100:15 to 100:40 wherein the epoxy terminated polyester on the first film contacts the curative composition on the second film;
wherein an in situ reaction occurs between the epoxy terminated polyester on the first film and the curative composition on the second film to form a bond between the first film and the second film; and
wherein a bonded laminate structure consisting of a first film and a second film with a bond layer of laminating adhesive disposed in between the first film and the second film is formed, and the laminating adhesive (1) is free of isocyanate and is free of bisphenol-A.

12. The process of claim 11 wherein the laminating adhesive (2) consists of (i) the epoxy terminated polyester and (ii) the curative composition.

* * * * *